United States Patent
Chang

(10) Patent No.: US 8,151,184 B2
(45) Date of Patent: Apr. 3, 2012

(54) METHOD FOR PROMOTING THE ACCESSING EFFICIENCY WITH EMBEDDED WEB PAGE

(75) Inventor: Wei-Kang Chang, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 282 days.

(21) Appl. No.: 12/541,283

(22) Filed: Aug. 14, 2009

(65) Prior Publication Data
US 2010/0050071 A1    Feb. 25, 2010

(30) Foreign Application Priority Data
Aug. 19, 2008    (TW) .............................. 97131594 A

(51) Int. Cl.
*G06F 17/00*    (2006.01)
(52) U.S. Cl. ....................................................... 715/234
(58) Field of Classification Search .................. 715/234, 715/237, 242, 243, 273
See application file for complete search history.

(56) References Cited

U.S. PATENT DOCUMENTS

| | | | | |
|---|---|---|---|---|
| 5,859,971 A * | 1/1999 | Bittinger et al. | ............. | 709/203 |
| 6,101,509 A * | 8/2000 | Hanson et al. | ............... | 715/205 |
| 6,112,242 A * | 8/2000 | Jois et al. | ...................... | 709/225 |
| 6,157,935 A * | 12/2000 | Tran et al. | ..................... | 715/202 |
| 6,247,056 B1 * | 6/2001 | Chou et al. | .................... | 709/229 |
| 6,591,272 B1 * | 7/2003 | Williams | .............................. | 1/1 |
| 7,165,222 B1 * | 1/2007 | Suzuki | .......................... | 715/744 |
| 7,458,091 B1 * | 11/2008 | Getsin et al. | ..................... | 725/97 |
| 7,627,658 B2 * | 12/2009 | Levett et al. | .................. | 709/223 |
| 7,716,591 B2 * | 5/2010 | Chen et al. | ..................... | 715/743 |
| 8,060,486 B2 * | 11/2011 | Chatterjee et al. | ............ | 707/705 |
| 2002/0046281 A1 * | 4/2002 | Cope | .............................. | 709/227 |
| 2002/0124100 A1 * | 9/2002 | Adams | .......................... | 709/232 |
| 2004/0064469 A1 * | 4/2004 | Takahashi et al. | ............ | 707/100 |
| 2004/0207654 A1 * | 10/2004 | Hasuike | ......................... | 345/698 |
| 2004/0258300 A1 * | 12/2004 | Proteau et al. | ................ | 382/162 |
| 2004/0261017 A1 * | 12/2004 | Perry | ............................ | 715/513 |
| 2006/0242653 A1 * | 10/2006 | Kostadinovich | .............. | 719/330 |
| 2007/0128899 A1 * | 6/2007 | Mayer | ........................... | 439/152 |
| 2008/0098291 A1 * | 4/2008 | Bradley et al. | ................ | 715/223 |
| 2008/0126943 A1 * | 5/2008 | Parasnis et al. | ............... | 715/730 |
| 2008/0158612 A1 * | 7/2008 | Iwasaki | ......................... | 358/3.26 |
| 2009/0055749 A1 * | 2/2009 | Chatterjee et al. | ............ | 715/738 |

* cited by examiner

*Primary Examiner* — Laurie Ries
(74) *Attorney, Agent, or Firm* — WPAT., P.C.; Justin King

(57) ABSTRACT

A method for promoting the accessing efficiency with embedded WEB page is disclosed, the method comprises at least the steps of a). when a browsing request to a HTTP server is sent by a user with a browser, the browsing request is transmitted to the HTTP server via a media, and then divided into a data request and a presentation request; b). the data request is processed by a web page generator to trigger corresponding CGI web page and the presentation request is processed by the web page generator to retrieve the corresponding HTML web pages; c). the web page generator receives the CGI web page and the HTML web page respectively and then converts them into web pages corresponding to the data request and the presentation request; and d). the web pages are transmitted by the HTTP server to the browser via the media and displayed to the user.

13 Claims, 3 Drawing Sheets

METHOD FOR PROMOTING THE ACCESSING EFFICIENCY WITH EMBEDDED WEB PAGE

FIELD OF THE INVENTION

The present invention relates to a method for promoting the accessing efficiency with embedded WEB page, and more particularly, to a method which divides the browsing request of a WEB page into two independent request to promote the accessing efficiency of browsing the WEB page.

BACKGROUND OF THE INVENTION

At present time, the Internet has been developed as the fastest channel for information exchange and communication and has been playing a major role in our daily life. The wild use of the Internet highlights the importance of a WEB site, however, the quality of the WEB page thereof determines the success of the WEB site.

The language used in web page design is HTML; the abbreviation of Hyper Text Markup Language, which differs from regular word process tool in its features of HyperText, HyperLink and HyperMedia, and works with the protocol HTTP (HyperText Transfer Protocol), cross platform communication over World Wide Web (WWW) can be achieved. HTML can be simply composed or edited by a regular text editor, such as Microsoft Word or Microsoft Notebook, which is regarded as another important feature thereof, and employing with the basic skill of HTML's Tag, a fancy web page can be easily created.

Please refer to FIG. 1, which is a diagram showing the system structure in which the user is browsing a web site with a browser. As shown in FIG. 1, a user 10 uses a browser 11 for sending a browsing request 12, the browsing request 12 is then transmitted to a web server 13 through a media (such as Internet). The web server 13 comprises a HTTP server 14, which receives the browsing request 12 and executes the commands contained therein to access a corresponding static web page 15 or execute the CGI programs 16 to generate a dynamic web page 17, finally, the web server 13 transmits the static web page 15 and the dynamic web page 17 generated by the CGI programs 16 to the browser 11 and then to be displayed to the user 11.

The original purpose of HTML language is to display static information, that is, to display rich multimedia information with simple syntactical rules, just like the billboard displaying the advertisement. Since WWW may bring in huge commercial profit, it eventually became widely popular. However, simple static web page gradually can not satisfy the requirement in practice. Especially, when the information the user requested is subject to a time factor and needs to be updated all the time, or the user's information needs to be stored, or the user needs to interact with the web page, CGI program will just work fine instead of the static web page.

Please refer to FIG. 1 again, as seen, a connection session is established between the browser and HTTP server of the web site when the user is using the browser to browse the web page of the web site, then, the HTTP server will retrieve the corresponding web page in HTML files and display it on the browser for user's browsing. In the above situation, since the HTML file (web page) is statical, dynamic information can not be displayed properly on the browser, therefore, the solution that generating the HTML files by program came out, and this is the origin of the CGI program. In other words, a connection session is also established between the browser and HTTP server of the web site when the user is using the browser to browse the CGI type web page on the web site, however, in this time, the HTTP server is not going to retrieve the corresponding HTML files (web page), but instead, to trigger a CGI program to generate a HTML files (web page) and display the HTML files (web page) on the browser for user's browsing.

CGI is the abbreviation of Common Gateway Interface, which establishes the standard of the method for transmitting the parameters and results between the HTTP server and the CGI programs.

As described above, CGI program is a standard interface program, which enables the communication between the HTTP server and the web page to achieve the interactive effects. More, with the CGI programs, the web page can be generated dynamically to display the most updated information of the web server. The information retrieved, when connecting to a CGI object, is not a static one but a HTML data stream dynamically generated by programs, and the data being transmitted back to the browser is being updated all the time, that is, it can be the instant response to the specific request of the user, such as the real time stock information. Simply, CGI program is able to generate dynamic web pages and enable the user to access the data in the legacy system via WWW.

The CGI programs has the following advantages, first, it is pretty hard to create a huge HTML document to contain all the updated data when the data needs to be updated all the time, so the only solution is to generate the HTML documents according to the date being updated. Second, since the data input by the user is received by the WWW server instead of the CGI program itself, CGI program is able to generate the information in HTML format based on the request input by the user. The standard employed by the CGI program itself can properly fulfill the functions described above, besides, the CGI programs is capable of accessing the various type of data in database, and that is the reason why it has been called Common Gateway Interface, just like a gateway to link the WWW system and the WWW server.

For example, a security company has a complete database which contains the history information of stock transaction price, now the requirement is to display the information in the HTML format to the customer for reference. In such situation, a common gateway program is necessary to communicate between the information of stock transaction price and the HTTP server and the CGI program is the choice. The CGI program takes the HTTP user's inquiry and converts it into the commands that can be interpreted by the legacy database to retrieve the information stored therein, then, the information retrieved is converted into HTML document which is transmitted by the HTTP server to the user and is displayed on the user's browser.

Although the CGI program offers a new option for processing the information on the dynamic web page, but as the demand of the dynamic web page increasing sharply, the more various type of data is created, such as the data of image, voice and multimedia is requested more and more gradually, which tremendously increases the loading of the system and slow down the response time to the user. The static web page displayed by the regular HTML program is supposed to rapidly respond to the user who submitted the browsing request, now it has to wait for the result of the CGI program, with which together to be displayed on the user's browser, thus, such process results in much longer time waiting for the response to the browser. Therefore, a new solution is demanded to improve the efficiency and to avoid the waste of system resource. As shown in FIG. 1, a traditional CGI program which embeds the presentation request and the data request into a single web page and further embeds into the same browsing request for HTTP server process now no longer meets the requirement of the efficiency of the web page processing.

SUMMARY OF THE INVENTION

In view of the trend of the web page technology, the primary object of the present invention is to provide a method for promoting the accessing efficiency with embedded WEB page, and more particularly, to a method which divides the browsing request of a WEB page into two independent request and execute them respectively to promote the accessing efficiency of browsing the WEB page.

To achieve the object described above, the method of the present invention comprises at least the following steps: when a browsing request to a web server is issued by a user with a browser, the browsing request is transmitted to a HTTP server of the web server via a media, and then divided into a data request and a presentation request; the data request and the presentation request are further processed by a web page generator, respectively, to trigger corresponding CGI web page and to retrieve the corresponding HTML web pages, next, the web page generator converts the result of the CGI web page and the retrieved HTML web page respectively into web pages corresponding to the data request and the presentation request, and the web pages are transmitted to the browser by the HTTP server via the media, and are eventually displayed to the user.

Preferably, according to the present invention, dividing the browsing request into the data request and the presentation request can be achieved by a software program which can be located on the HTTP server.

Preferably, according to the present invention, the function of the web page generator can be achieved by a software program.

Preferably, according to the present invention, as the CGI web page being updated, the request of execution of the CGI web page corresponding to the data request is executed at least one time.

Preferably, according to the present invention, as the CGI web page being updated, the receiving of the result of the CGI web page corresponding to the data request is executed at least one time.

Preferably, according to the present invention, the HTML web page is a static web page.

Preferably, according to the present invention, the CGI web page is a dynamic web page.

Preferably, according to the present invention, the media between the browser and web server is the Internet.

Preferably, according to the present invention, the HTTP server and the web page generator locate on the web server.

Preferably, the present invention also comprises a web page optimizer which is used to compress the HTML web page for faster display.

Preferably, according to the present invention, the function of the web page optimizer introduced above can be achieved by a software program.

Preferably, according to the present invention, the web page optimizer introduced above locates on either the HTTP server or the web server.

Preferably, the functions introduced in the present invention can be achieved by software programs instead of hardware.

As illustrated above, according to the present invention, the browsing request can be divided into the data request and the presentation request, then, the CGI web page associated with the data request and the HTML web page associated with the presentation request will be executed respectively, the static web page no longer needs to wait for the completion of the data update of the dynamic web page generated by the CGI program to be displayed to the browser, the HTML web page will respond to the browser faster, therefore reducing the time the user waiting for the display of the web page.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

For your esteemed members of reviewing committee to further understand and recognize the fulfilled functions and structural characteristics of the invention, several exemplary embodiments cooperating with detailed description are presented as the follows.

Figure 1:
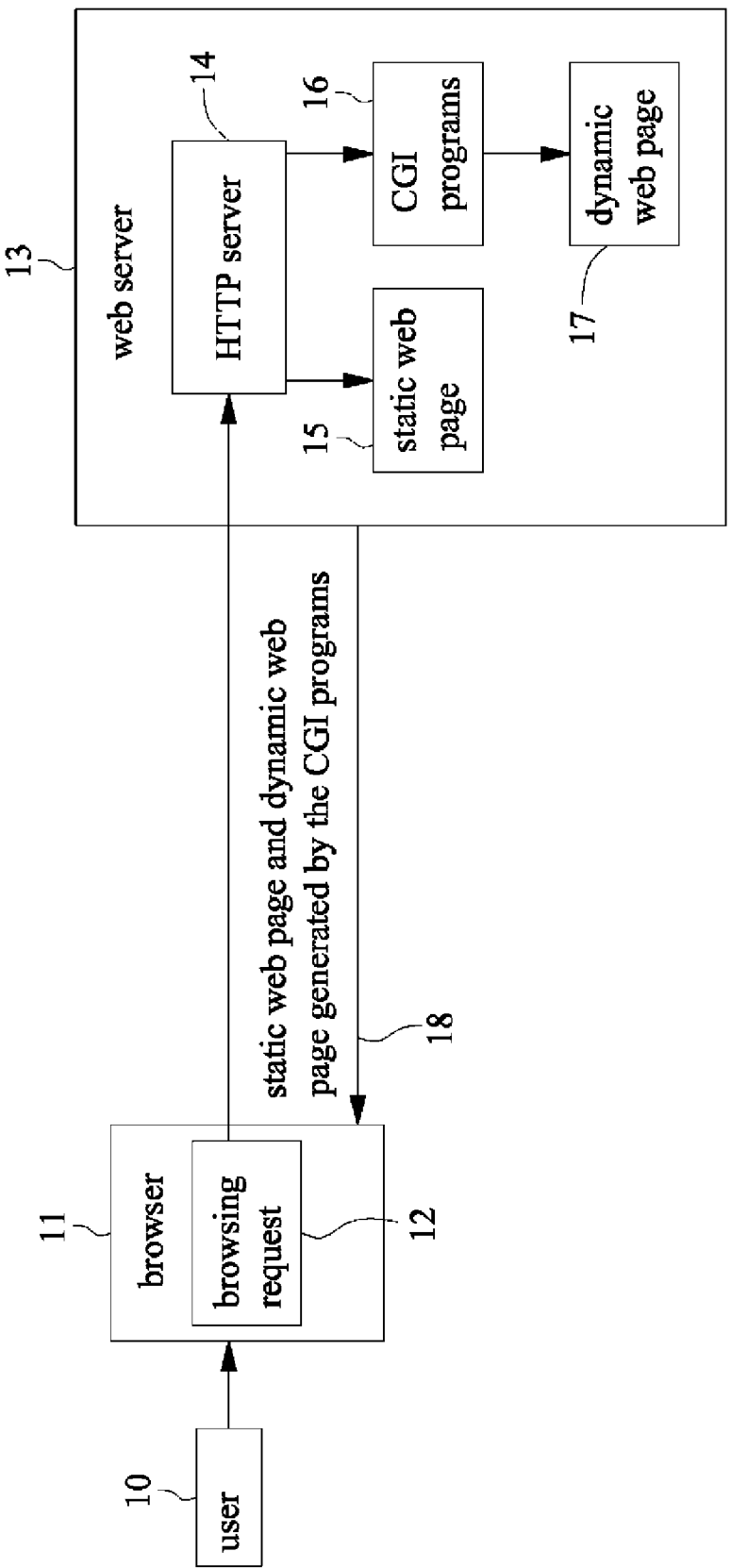
FIG. 1 is a diagram showing the system structure in which a user is using the browser for browsing a web site in the prior art.
Figure 2:
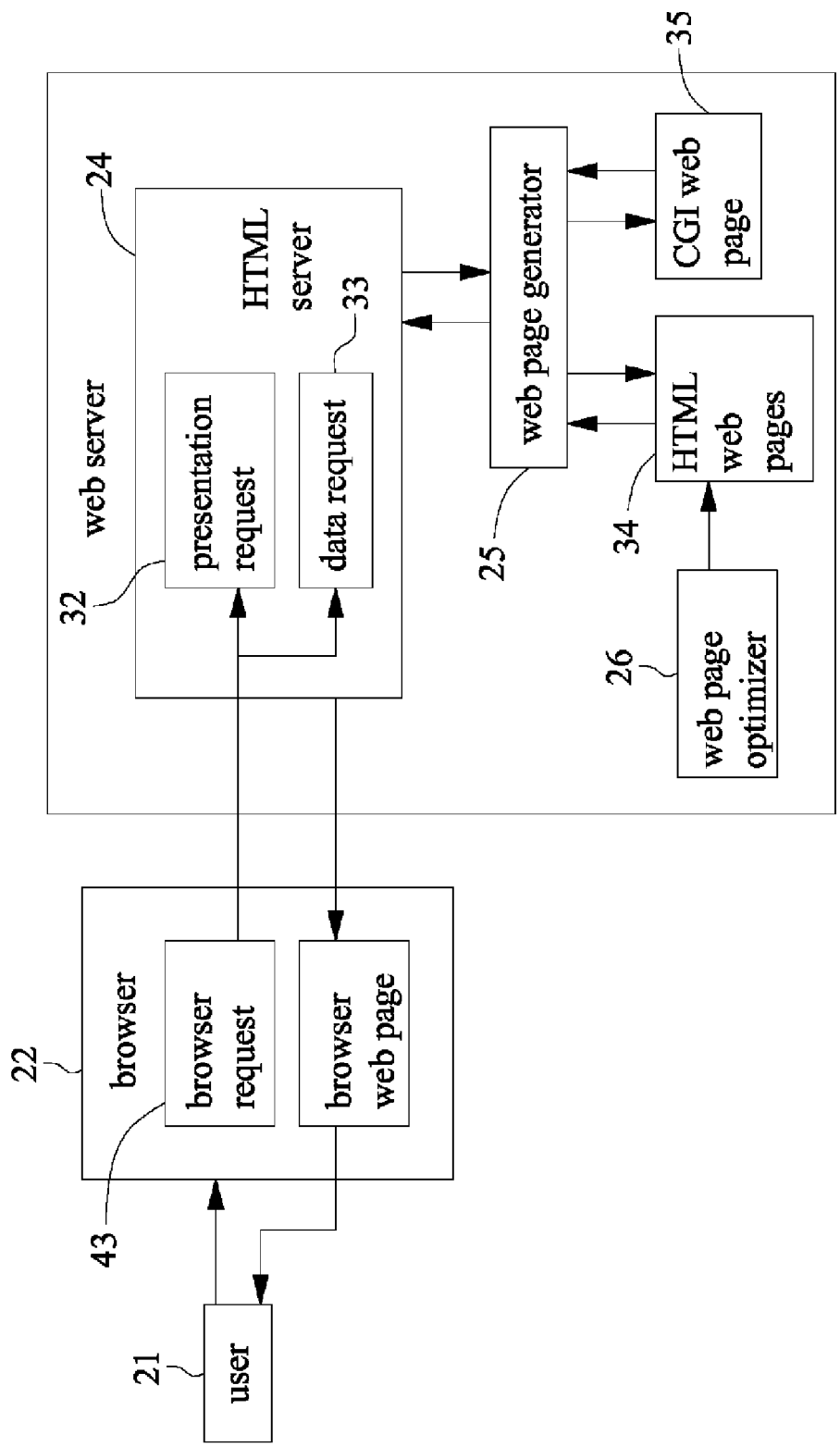
FIG. 2 is a diagram showing the system structure in which a user is using the browser for browsing a web site according to the present invention.

Please refer to FIG. 2, which is a diagram showing the system structure in which a user is using the browser for browsing a web site according to the present invention. As shown in FIG. 2, a user 21 uses a browser 22 for sending a browsing request 43, the browsing request 43 is then transmitted to a HTTP server 24 through a media (such as Internet), the browsing request 43 is then divided into a presentation request 32 and a data request 33; the data request 33 and the presentation request 32 are further processed by a web page generator 25, respectively, to trigger corresponding CGI web page 35 and to retrieve the corresponding HTML web pages 34, next, the web page generator 25 converts the result of the CGI web page 35 and the retrieved HTML web page 34 respectively into web pages corresponding to the data request 33 and the presentation request 32, and the web pages are transmitted to the browser 22 by the HTTP server 24 via the media (such as Internet), and are eventually displayed to the user 21. And in order to display the web page faster, the HTML web page 34 can be compressed by a web page optimizer 26.

Figure 3:
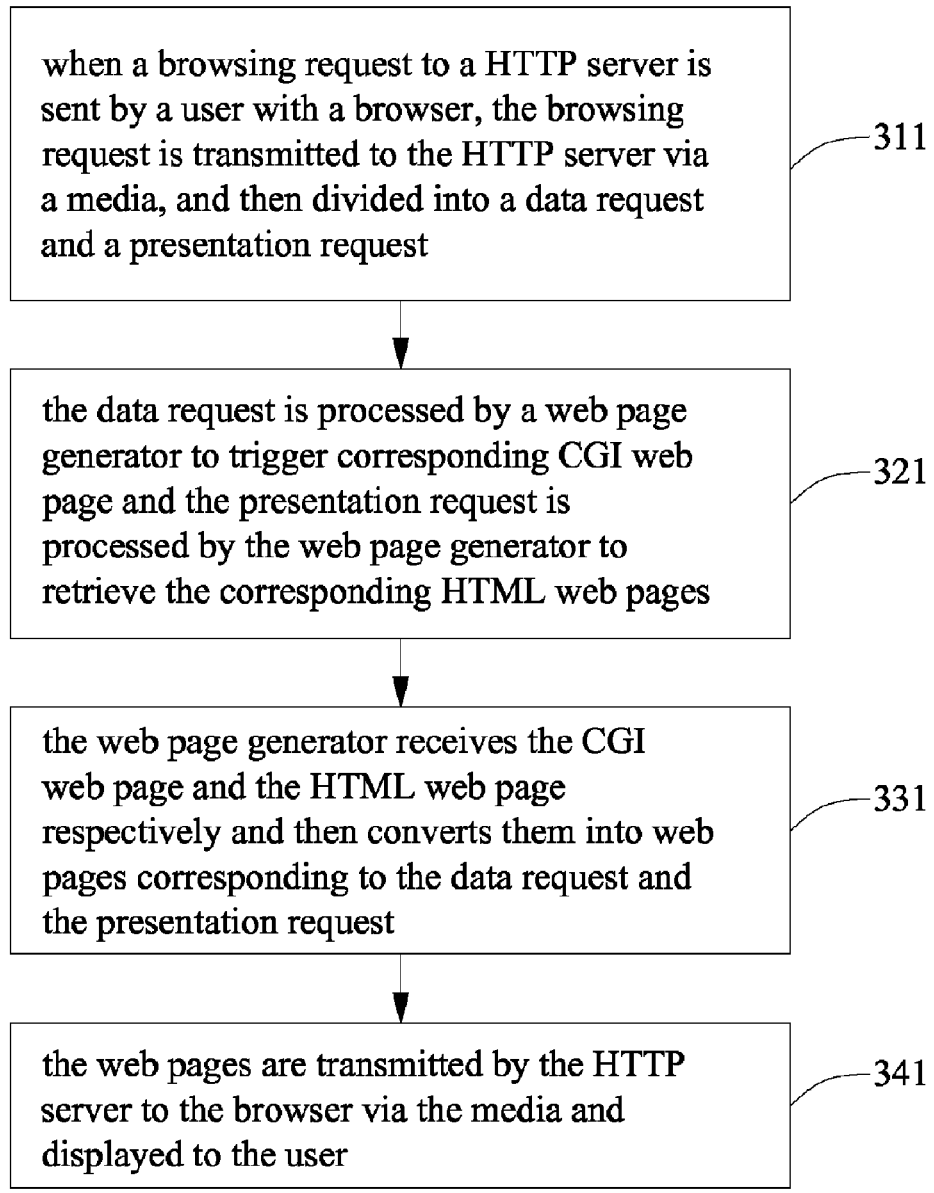
FIG. 3 is a diagram showing the flows of the method according to the present invention.

Please refer to FIG. 3, which is a diagram showing the flows of the method according to the present invention. As shown in FIG. 3, the method for promoting the accessing efficiency with embedded WEB page according to the present invention comprises at least the following steps:

Step 311: when a browsing request to a HTTP server is sent by a user with a browser, the browsing request is transmitted to the HTTP server via a media, and then divided into a data request and a presentation request;

Step 321: the data request is processed by a web page generator to trigger corresponding CGI web page and the presentation request is processed by the web page generator to retrieve the corresponding HTML web pages;

Step 331: the web page generator receives the CGI web page and the HTML web page respectively and then converts them into web pages corresponding to the data request and the presentation request; and Step 341: the web pages are transmitted by the HTTP server to the browser via the media and displayed to the user.

The above embodiments and the accompanying drawings clearly show that, traditionally, the browsing request usually comprises a presentation request and a data request, that is, the static data request and the dynamic data request are encapsulated in a single request, for which, the system resource would not be distributed and managed efficiently, therefore, when data volume is huge, the system loading is heavy. To overcome this shortcoming, the present invention provides a method for promoting the accessing efficiency with embedded WEB page, in which the browsing request is divided into a data request and a presentation request, that is, the static data request and the dynamic data request are processed by the system respectively, besides, a web page optimizer is included to compress the web pages, thus, accessing the corresponding static web page directly is enabled. With the method disclosed in the present invention, the system resource can be distributed and managed efficiently, and the response time of the web page to the user is faster, especially for the increasing amount of the multimedia data demanded for the Internet environment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for promoting the accessing efficiency with embedded WEB page, comprising at least the following steps:
   a) a browsing request is issued by a user with a browser, the browsing request is transmitted to a HTTP server via a media, and then the HTTP server divide the browsing request into a data request and a presentation request;
   b) the data request is processed by a web page generator to trigger corresponding CGI web page and the presentation request is processed by the web page generator to retrieve the corresponding HTML web pages;
   c) the web page generator receives the CGI web page and the HTML web page respectively and then converts them into web pages corresponding to the data request and the presentation request; and
   d) the web pages are transmitted by the HTTP server to the browser via the media and displayed to the user.

2. The method of claim 1, wherein the media can be Internet.

3. The method of claim 1, wherein dividing the browsing request into the data request and the presentation request can be achieved by a software program which can be located on the HTTP server.

4. The method of claim 1, wherein the function of the web page generator can be achieved by a software program.

5. The method of claim 1, wherein the request of execution of the CGI web page corresponding to the data request is executed at least one time.

6. The method of claim 1, wherein the receiving of the result of the CGI web page corresponding to the data request is executed at least one time.

7. The method of claim 1, wherein the HTML web page is a static web page.

8. The method of claim 1, wherein the CGI web page is a dynamic web page.

9. The method of claim 1, wherein the media between the browser and web server is the Internet.

10. The method of claim 1, wherein a web server is included, and the HTTP server and the web page generator locate on the web server.

11. The method of claim 1, wherein a web page optimizer is included, said optimizer is used to compress the HTML web page for faster display.

12. The method of claim 10 or 11, the web page optimizer locates on either the HTTP server or the web server.

13. The method of claim 11, wherein the function of the web page optimizer introduced above can be achieved by a software program.

* * * * *